(12) United States Patent
Bartone, Sr.

(10) Patent No.: US 7,892,820 B1
(45) Date of Patent: Feb. 22, 2011

(54) SOLAR COMPOSTING ASSEMBLY

(76) Inventor: John A Bartone, Sr., 625 E. 29th St., Erie, PA (US) 16504

( * ) Notice: Subject to any disclaimer, the term of this patent is extended or adjusted under 35 U.S.C. 154(b) by 167 days.

(21) Appl. No.: 11/975,587

(22) Filed: Oct. 18, 2007

Related U.S. Application Data

(60) Provisional application No. 60/852,770, filed on Oct. 18, 2006.

(51) Int. Cl.
*C12M 1/02* (2006.01)
(52) U.S. Cl. ............. 435/290.3; 435/290.1; 435/290.2; 435/290.4
(58) Field of Classification Search .... 435/290.1–290.4
See application file for complete search history.

(56) References Cited

U.S. PATENT DOCUMENTS

| | | | | |
|---|---|---|---|---|
| 4,473,970 | A * | 10/1984 | Hills | 47/1.4 |
| 5,300,438 | A * | 4/1994 | Augspurger et al. | 435/290.3 |
| 5,457,031 | A * | 10/1995 | Masse | 435/41 |
| 5,787,877 | A * | 8/1998 | Nicklas et al. | 126/601 |
| 6,001,641 | A * | 12/1999 | Posselius et al. | 435/286.1 |
| 6,110,733 | A * | 8/2000 | Seymour | 435/290.3 |
| 7,371,566 | B1 * | 5/2008 | Craven, Jr. | 435/290.3 |
| 2002/0115199 | A1 * | 8/2002 | Thompson | 435/290.1 |
| 2003/0024686 | A1 * | 2/2003 | Ouellette | 165/47 |
| 2004/0025864 | A1 * | 2/2004 | Aronds | 126/669 |
| 2005/0089998 | A1 * | 4/2005 | Miller | 435/290.3 |

OTHER PUBLICATIONS

Drum Systems, Website Homepage, Web Archive <http://web.archive.org/web/20050907165832/http://www.drumsystems.com/> (Sep. 7, 2005).*

* cited by examiner

*Primary Examiner*—Jill Warden
*Assistant Examiner*—Jameson Q Ma
(74) *Attorney, Agent, or Firm*—Richard K Thomson

(57) ABSTRACT

A cylindrical composting drum which is 6', 8', or 10' in diameter, extends between 40' and 140' in length. The drum is rotated and internal helical blades move the material from inlet end to a screen separator at an outlet end. Partially arcuate solar reflectors underlie the drums and reflect solar energy onto the outer surface of the drums which have been blackened to enhance energy absorption. The use of the available solar energy accelerates the composting process. A microprocessor controls the addition of moisture and the timing and rate of rotation of the drums.

8 Claims, 4 Drawing Sheets

SOLAR COMPOSTING ASSEMBLY

This patent application claims priority of provisional patent application Ser. No. 60/852,770 filed Oct. 18, 2006.

BACKGROUND AND SUMMARY OF THE INVENTION

The present invention is directed to the field of waste reduction. More particularly, the present invention is directed to solar compost unit designed to reduce multiple types of waste products into useful end products.

Waste disposal is becoming a burgeoning problem for our society. Land fills are threatening to burst at the seems, while manure from dairy farms, pig farms, poultry farms, and sheep ranches creates significant additional disposal problems. On top of these waste issues, food waste from restaurants, school cafeterias, and the like, are attractive to vermin and breeding grounds for insects. In spite of efforts to recycle newspapers, other forms of waste paper are contributing significantly to the waste management issues at disposal sites. Finally, waste from grape processing plants, both juice producers and wineries, afford challenges of disposal that have not yet been adequately addressed by existing systems.

It is estimated that between 50 and 80% of materials finding their way to land fills/garbage dumps would be suitable for recovery through composting. In addition, the thousands of tons of manure and grape waste could be converted to useful end products through composting. Many composting systems in use today are extremely slow and only partially effective in converting organic waste into useful fertilizers. It is an object of the present invention to provide a composting system which can convert these multiple types of organic waste into useful fertilizers in a shortened period of time (in weeks rather than months).

The solar composting assembly of the present invention comprises a cylindrical drum having a first receiving end for receiving material to be composted and a second discharge end for delivering the composted material, the cylindrical drum having a first longitudinal axis, material advancing means within the cylindrical drum for advancing the material to be composted through the cylindrical drum; support means holding the cylindrical drum in a fixed axial position while permitting rotation about the first longitudinal axis; drive means to rotate the cylindrical drum about the first longitudinal axis; whereby when the drive means rotates the cylindrical drum about the first longitudinal axis, the material advancing means moves the material to be composted from the first receiving end to the second discharge end. The solar composting assembly further comprises a partially arcuate solar reflector lying beneath a portion of the cylindrical drum, the solar reflector having a polished upper surface for capturing solar radiation and reflecting the solar radiation onto an outer surface of the cylindrical drum. Preferably, both the cylindrical drum and the solar reflector being made of stainless steel, the drum having a blackened outer surface to increase the amount of solar radiation retained by the cylindrical drum which is reflected by said solar reflector and gathered by the upper surface thereof. The support means preferably comprises a plurality of rollers underlying the cylindrical drum and the drive means comprises motor means for rotating at least some of the plurality of rollers. In addition, the drive means includes a reversible motor capable of rotating said cylindrical drum in either rotational direction and a plurality of friction-enhancing bands extending about the cylindrical drum in positions to be engaged by the plurality of rollers rotated by the drive means. The solar composting assembly includes control means for determining when and in what direction to rotate the drive means. Subterranean conduits for collecting and conveying liquids produced by the composting assembly are provided.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
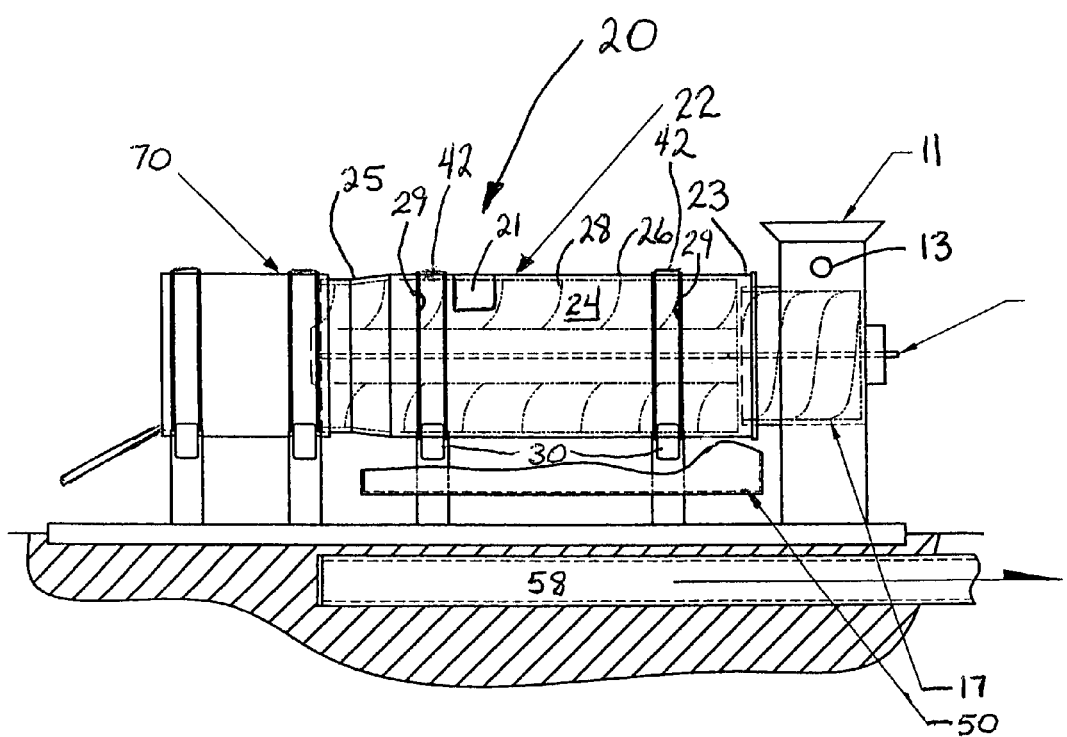
FIG. 1 is a front view of a first embodiment of the solar composting assembly of the present invention.
Figure 2:
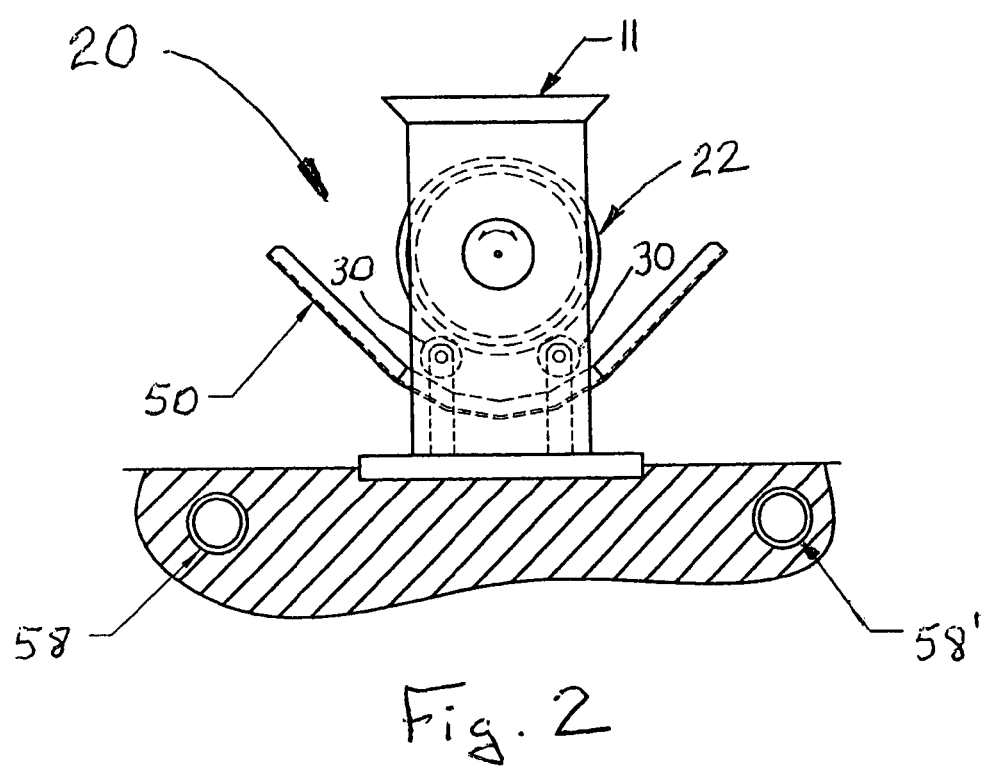
FIG. 2 is an end view of the first embodiment.

A first embodiment of the solar composting unit is shown in FIGS. 1-2 generally at 20. Solar composting assembly 20 comprises a cylindrical drum 22 preferably made of stainless steel having a blackened exterior surface 24 which may take the form of a coating such as paint or more preferably, a baked on enamel. Cylindrical drum 22 will typically be made in 20 foot lengths with diameters of 6, 8, or 10 feet, depending on the desired capacity of the composting assembly 20. The overall length of solar composting assembly will depend on its capacity and the nature of the materials to be composted but will, typically, extend between 40' and 140'. Drum 22 has first receiving end 23 and second discharge end 25 with dual helical blades 26, 28 welded to the interior surface extending from first receiving end 23 to second discharge end 25.

A separate inlet 11 having a feed drum 15, which has its own internal helical blade 17, delivers prepared material for composting to receiving end 23. Inlet 11 will be provided with a sealed lid to maintain odors in and weather out and an inlet portal 13. Preferably, feed drum 15 has its own drive means. Preparation of the materials will include a blending a variety of types of materials for composting drawn from food waste, paper, manure, grape pulp, etc. The materials will be blended and ground into a fine pulp to accelerate the composting process. Depending on the specifics of the mix to be processed (i.e., the natural bacteria present), starter bacteria may be added in the blending process, if needed. Cylindrical drum 20 is mounted in a fixed axial position for rotation about its longitudinal axis by a plurality of rollers 30. At least some of the rollers 30 are driven by a reversible motor 40 (FIG. 3) which may be electric or hydraulic. As motor 40 turns cylindrical drum 22, helical blades 26, 28 advance the material being composted through the length of the drum. A plurality of channel tracks 29 are formed in the exterior surface 24 into which heavy duty elastomeric bands 42 are positioned. These bands 42 increase friction between the drive rollers 30 and the drum surface 24. Should additional force be necessary, as for larger, heavier composting systems 20, the roller/band drive system could be replaced by a ring and pinion gear drive system (not shown). Portal 13 will permit manure transported from a dairy farm collection pond to holding tank 60 (FIG. 4) to be progressively added to the compost mix by pumping a portion of the slurried manure into inlet 11. A 2'×2' access port 21 is afforded in drum 22. This port permits entry into the drum 22 in the event that problems arise. The port will, of course, be sealed and a charcoal filter (not shown) is provided to deodorize any air which may escape around the seal.

Figure 3:
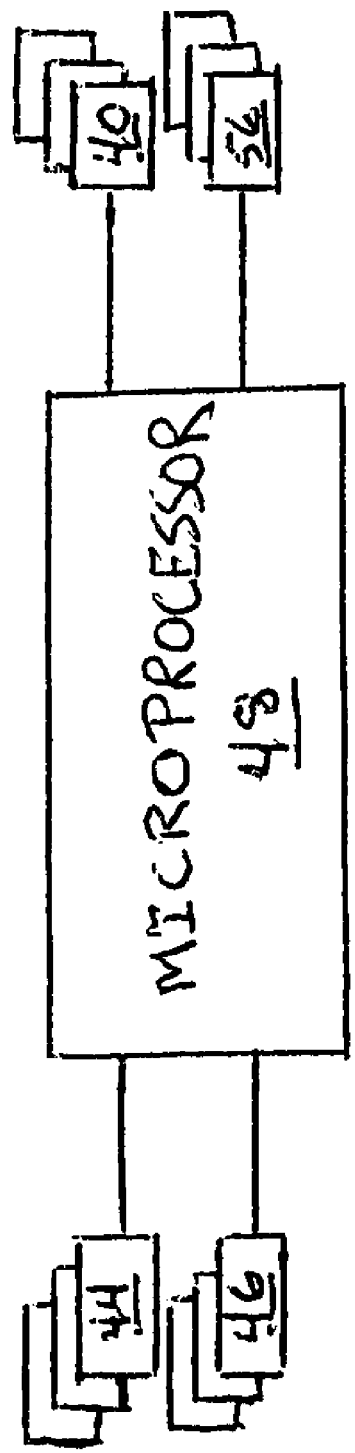
FIG. 3 schematic diagram of the control circuitry used in first embodiment; and, FIG. 4 is a schematic perspective view of a possible composting plant layout.

A partially arcuate solar reflector 50 lies beneath cylindrical drum 22. Inner surface of stainless steel reflector 50 is highly polished and captures solar radiation from around drum 22 and reflects it onto the blackened surface 24 so that the solar energy available is utilized to increase the temperature of the materials within drum 22. It anticipated that most venues will have adequate solar energy available to facilitate year round operation. However, additional external heating can be provided, if needed. As seen in FIG. 3, thermometer 44 and hydrometer 46 detect the temperature and the moisture content within drum 22 and feed that information to microprocessor 48 which controls the operation of solar composting assembly 20. Microprocessor 48 can add water by signaling pump 54 to provide water through supply line 52, activate motor 40 to rotate in either direction to move material forward or backward within drum 22 responsive to conditions determined by sensors 44, 46. Multiple thermometers 44, hydrometers 46, motors 40, and water pumps 54 are depicted in FIG. 3 as each 20' length of drum 22 will have its own sensors and responsive equipment. Accordingly, the actual number of each will vary from two for the 40' assembly to seven for the 140' length. The water supplied through supply line 52 may be tap water but, more preferably, it is water captured by solar reflector 50 as rain or snow melt and fed to a collecting vessel (not shown) through conduit 58 or 58'. Screen separator 70 is provided at the output end of each cylindrical drum 22. Screen separator 70 eliminates any log, plastic piece, or other item which has not been completely reduced through the composting process.

Materials which may be composted in assembly 20 include alfalfa meal, apple pomace, bio-pulp, brewer's mash, cardboard, cattle manure, coal fly ash, corn stalks, fruit pomace, garbage (i.e., food waste), grass trimmings, hog manure, horse manure, leaves, lime, malt meal, paper, paper pulp, produce scraps, poultry manure, sawdust, shrubbery trimmings, silt, soybean meal, sugar beet pulp, tomato pomace, vegetable pomace, wood, wood ashes, wood bark, wood chips. Products emanating from the assembly 20 (depending on the nature of the mix composted) are suitable as soil amendments and are classified in one of four categories: Class I: Organics and Earthen for home gardens; Class II: Organics, Manure and Earthen for home gardens; Class Organics, Paper, Inert and Earthen for landscaping nurseries; and Class IV: Organics, Paper, Inert and Earthen for local land reclamation projects.

Figure 4:
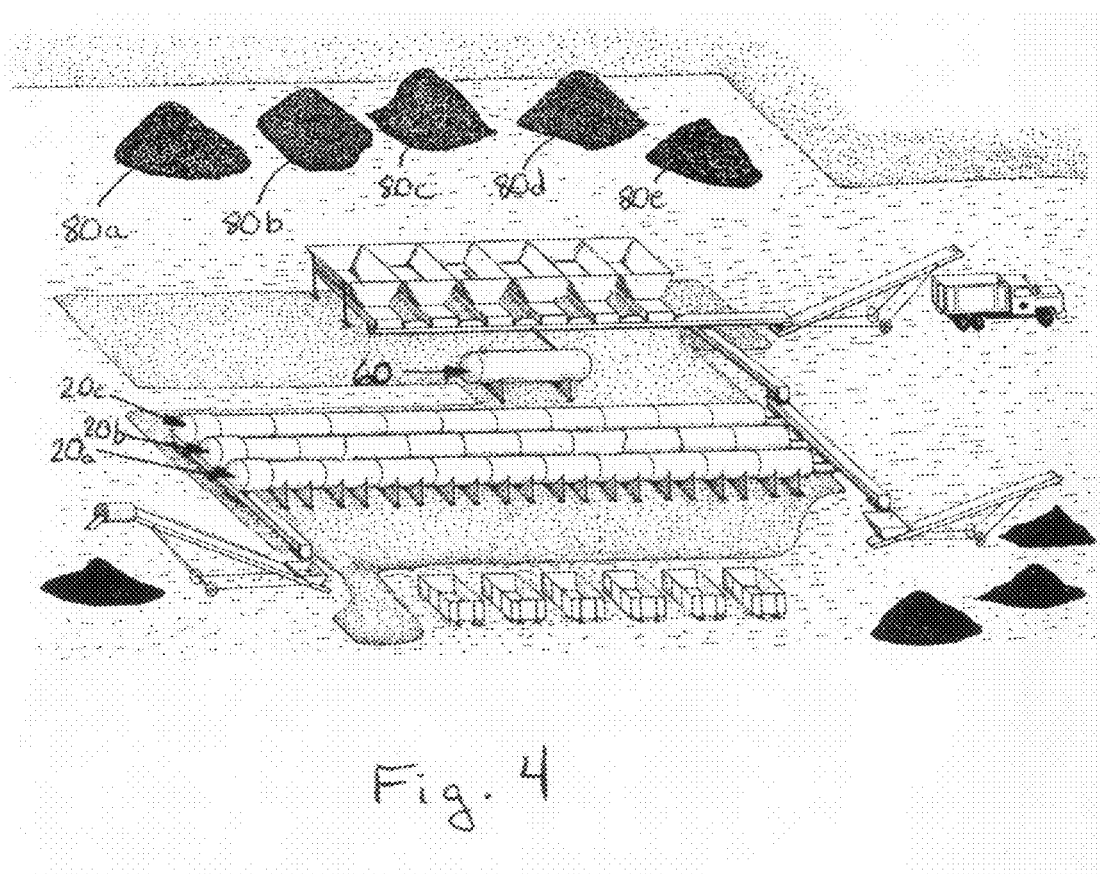

As depicted in FIG. 4, a compost processing plant will have supply piles 80a, 80b, 80c, 80d, 80e for various types of materials to be composted. Although a separate blending station 82 may be utilized in some instances, it is generally desired that the mixing of materials be done directly in inlet 11. The specifics of the composting purpose for which the processing plant is established will determine the particular layout. Additionally, while this depiction shows a single screening unit 84 for all of the composting assemblies 20a, 20b, 20c, the more preferred configuration integrates the screening separator 70 (FIG. 1) into each line. Further, although assemblies 20a, 20b, 20c are depicted as each having identical lengths, it is more likely that assemblies will have varying lengths to compost a variety of materials into the various categories (Classes I-IV) set out above.

Food waste, lawn and garden trimmings, waste paper, animal waste, fruit pulp from processing plants, combined are threatening to bury us and are a major problem in our society. Many people are seeking a solution to these disposal problems. The solar composting assembly 20 of the present invention presents a solution that meets all of these needs. The system affords a self-regulating process which typically requires 20-28 days to reduce a waste problem into a soil conditioner product. The materials to be composted are blended, placed into inlet 11 and, in less than 1 month, the compost emerges from screen separator 70.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A solar energy composting assembly consisting essentially of:
   a. a cylindrical drum having a first receiving end for receiving material to be composted and a second discharge end for delivering the composted material, said cylindrical drum having a first longitudinal axis, material advancing means within said cylindrical drum for advancing the material to be composted through said cylindrical drum;
   b. support means holding said cylindrical drum in a fixed axial position as well as a fixed transverse position, while permitting rotation about said first longitudinal axis;
   c. drive means to rotate said cylindrical drum about said first longitudinal axis;
   d. a partially arcuate solar reflector lying beneath a portion of said cylindrical drum, said solar reflector having a polished upper surface for capturing solar radiation and reflecting the solar radiation onto an outer surface of said cylindrical drum;
   whereby when said drive means rotates said cylindrical drum about said first longitudinal axis, said material advancing means moves the material to be composted from said first receiving end to said second discharge end;
   wherein said cylindrical drum is made of stainless steel having an outer surface entirely covered with a black coating to increase an amount of solar radiation retained by said cylindrical drum which is reflected by said solar reflector.

2. The solar energy composting assembly of claim 1 wherein said solar reflector is manufactured of stainless steel.

3. The solar energy composting assembly of claim 1 wherein said support means comprises a plurality of rollers underlying said cylindrical drum.

4. The solar energy composting assembly of claim 3 wherein said drive means comprises motor means for rotating at least some of said plurality of rollers.

5. The solar energy composting assembly of claim 4 wherein said drive means comprises a reversible motor capable of rotating said cylindrical drum in either rotational direction.

6. The solar energy composting assembly of claim 5 wherein said drive means further comprises a plurality of friction-enhancing bands extending about said cylindrical drum in positions to be engaged by said at least some of said plurality of rollers rotated by said drive means.

7. The solar energy composting assembly of claim 6 further comprising control means including sensors and a microprocessor for determining when and in what direction to rotate said drive means to optimize compost reduction.

8. The solar energy composting assembly of claim 1 further comprising subterranean conduits for collecting and conveying liquids produced by said composting assembly.

\* \* \* \* \*